United States Patent
Lee et al.

(10) Patent No.: US 9,353,802 B2
(45) Date of Patent: May 31, 2016

(54) DISCONNECT FOR A SWITCHABLE WEDGE CLUTCH

(71) Applicant: Schaeffler Technologies GmbH & Co. KG, Herzogenaurach (DE)

(72) Inventors: Brian Lee, York, SC (US); Carsten Ohr, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/333,051

(22) Filed: Jul. 16, 2014

(65) Prior Publication Data

US 2015/0027840 A1   Jan. 29, 2015

Related U.S. Application Data

(60) Provisional application No. 61/857,785, filed on Jul. 24, 2013.

(51) Int. Cl.
| | |
|---|---|
| *F16D 13/26* | (2006.01) |
| *F16D 13/16* | (2006.01) |
| *F16D 23/12* | (2006.01) |

(52) U.S. Cl.
CPC ............... *F16D 13/26* (2013.01); *F16D 13/16* (2013.01); *F16D 2023/123* (2013.01)

(58) Field of Classification Search
None
See application file for complete search history.

(56) References Cited

U.S. PATENT DOCUMENTS

| | | | |
|---|---|---|---|
| 1,686,226 A * | 10/1928 | Conkling | ......................... 192/65 |
| 1,917,999 A | 7/1933 | Spear | |
| 2,257,912 A | 10/1941 | Kraft | |
| 3,233,710 A | 2/1966 | Daniels | |
| 9,016,451 B2 * | 4/2015 | Davis | .......................... 192/45.1 |
| 2014/0014455 A1* | 1/2014 | Davis | .......................... 192/45.1 |
| 2014/0110207 A1 | 4/2014 | Davis | |
| 2014/0332335 A1* | 11/2014 | Strong | ............................ 192/43 |

* cited by examiner

*Primary Examiner* — Robert Hodge
*Assistant Examiner* — Stacey Fluhart
(74) *Attorney, Agent, or Firm* — Simpson & Simpson, PLLC

(57) ABSTRACT

A wedge clutch, including: an inner hub; an outer race; and a conical outer race: including a first portion aligned with the outer race in a radial direction orthogonal to an axis of rotation for the wedge clutch and in an axial direction, and a second portion aligned with the outer race in an axial direction parallel to the axis. The conical outer race is axially displaceable with respect to the outer race to bring the first and second portions into contact with the outer race to non-rotatably connect the inner hub and the outer race and to separate the first and second portions from the outer race to enable relative rotation of the inner hub and the outer race. The wedge clutch includes a wedge plate radially located between the inner hub and the conical outer race and engaged with the inner hub and the conical outer race.

20 Claims, 8 Drawing Sheets

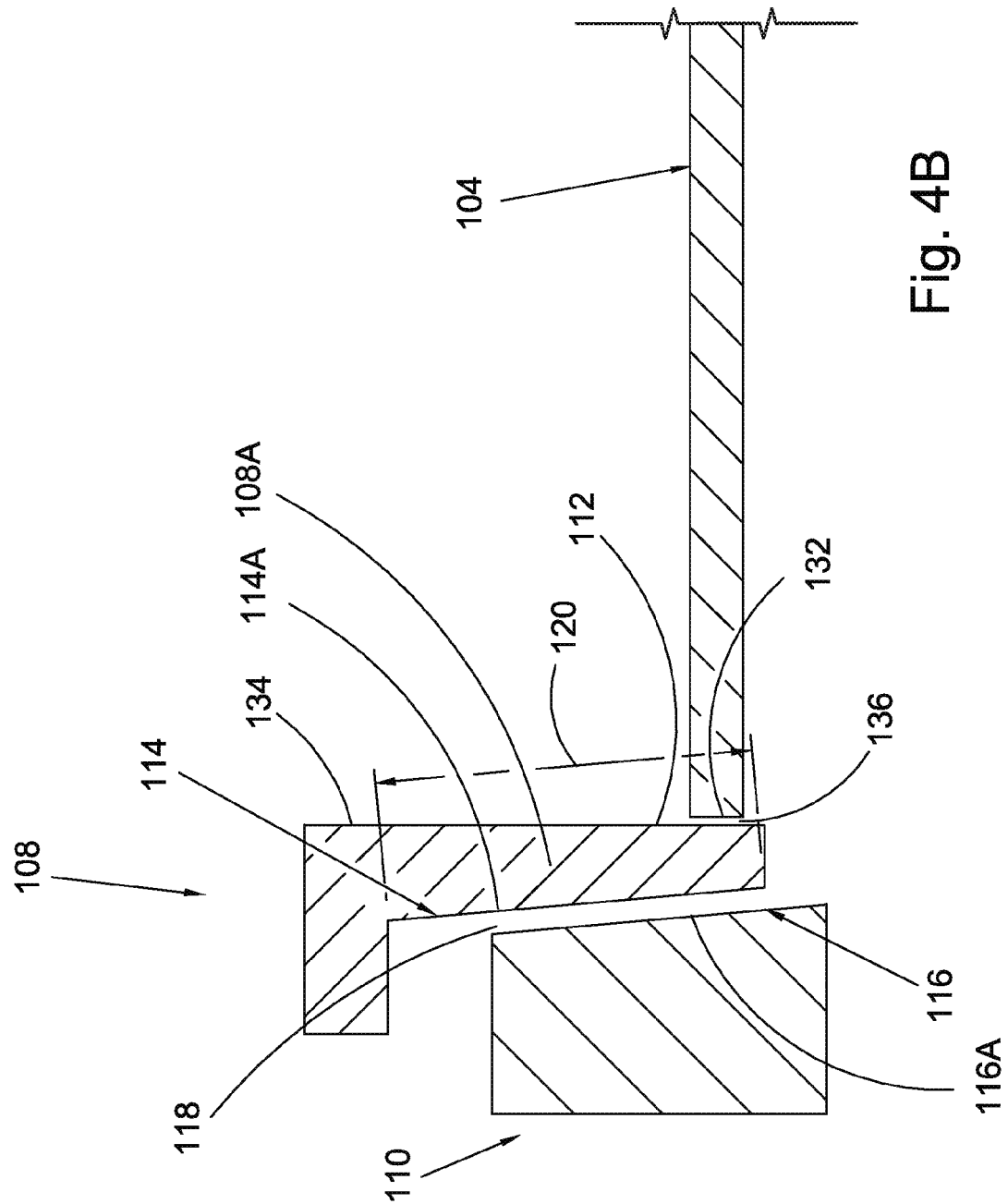

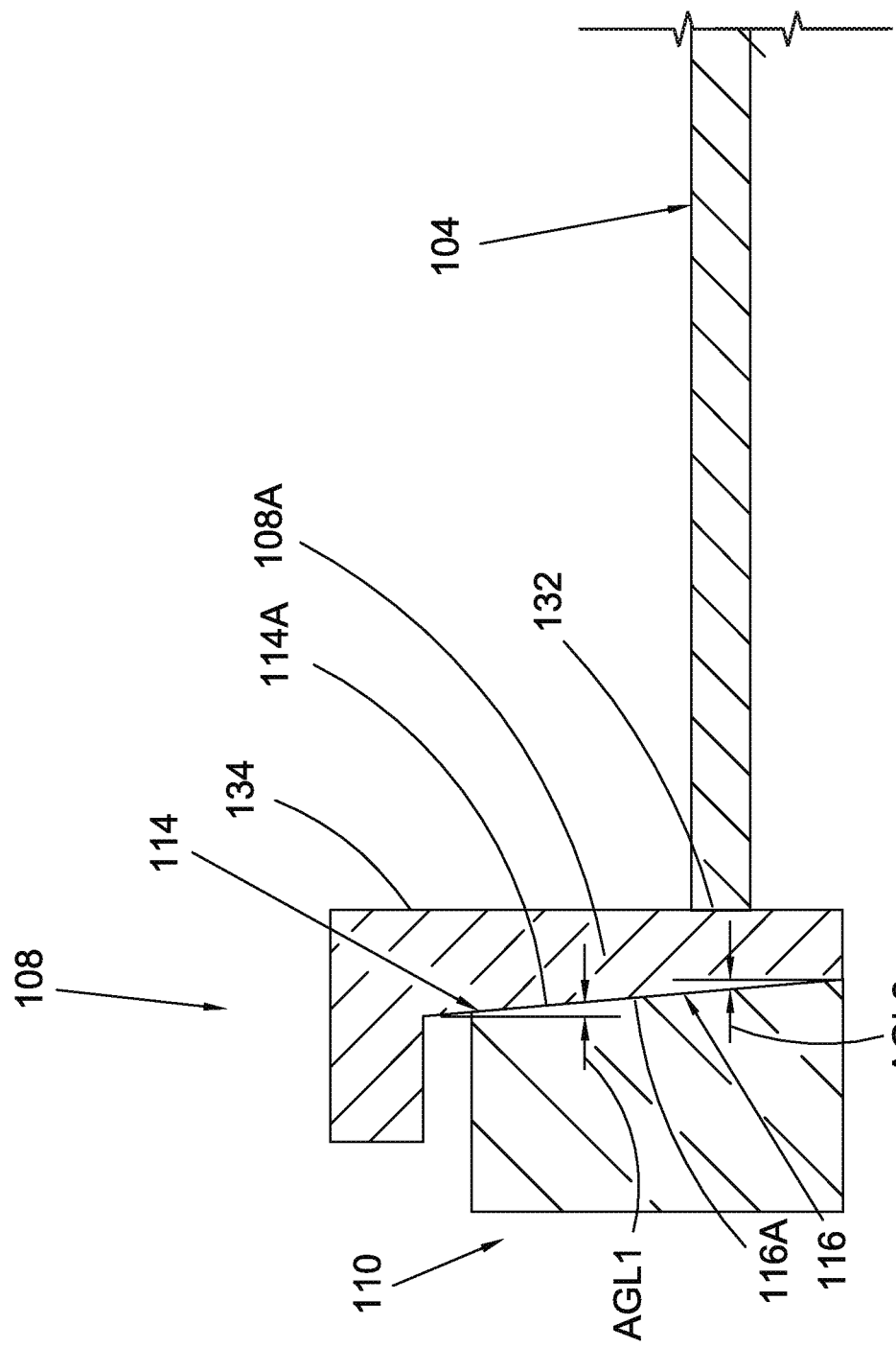

DISCONNECT FOR A SWITCHABLE WEDGE CLUTCH

CROSS-REFERENCE TO RELATED APPLICATIONS

This application claims the benefit under 35 U.S.C. §119 (e) of U.S. Provisional Patent Application No. 61/857,785, filed Jul. 24, 2013, which application is incorporated herein by reference in its entirety.

TECHNICAL FIELD

The present disclosure relates to a wedge disconnect clutch for an all-wheel drive, in particular, a wedge disconnect clutch with cone-shaped outer races, one of which is axially displaceable to connect and disconnect the clutch.

BACKGROUND

It is known to use wedge plate clutches for switchable clutch applications. Commonly owned U.S. Provisional Patent Application No. 61/715,518 discloses a switchable one way clutch using a two piece outer race. The two pieces are displaceable axially away from each other to open the clutch and the two pieces are displaceable axially toward each other to close the clutch. Active force must be applied to the two pieces to prevent the two pieces from separating due to radially outwardly acting forces from a wedge plate in contact with the two pieces.

SUMMARY

According to aspects illustrated herein, there is provided a wedge clutch, including: an inner hub; an outer race assembly including a first outer race and a conical outer race including a portion aligned with the first outer race in a radial direction orthogonal to an axis of rotation for the wedge clutch and axially displaceable with respect to the first outer race to open and close the wedge clutch; and a wedge plate radially located between the inner hub and the outer race assembly. In a closed position for the wedge clutch, the wedge plate is non-rotatably connected to the inner hub and the first outer race. In an open position for the wedge clutch, the inner hub and the first outer race are rotatable relative to each other.

According to aspects illustrated herein, there is provided a wedge clutch, including: an inner hub; an outer race assembly including a first outer race and a conical outer race including a first portion aligned with the first outer race in a radial direction orthogonal to an axis of rotation for the wedge clutch and including a second portion aligned with the first outer race in an axial direction parallel to the axis of rotation; and a wedge plate radially located between the inner hub and the conical outer race and engaged with the inner hub. The conical outer race is axially displaceable with respect to the first outer race: to bring the first and second portions into contact with the first outer race to non-rotatably connect the inner hub, the wedge plate, and the outer race assembly; and to separate the first and second portions from the first outer race to enable relative rotation between the inner hub and the first outer race.

According to aspects illustrated herein, there is provided a wedge clutch, including: an inner hub; an outer race assembly including a first outer race and conical outer race including a portion radially inward of the first outer race and aligned with the first outer race in a radial direction orthogonal to the axis of rotation; and a wedge plate engaged with the inner hub and located between the inner hub and the conical outer race in the radial direction. For a closed position of the wedge clutch, the conical outer race is displaceable in a first axial direction, parallel to the axis of rotation, to bring the portion of the conical outer race and the first outer race into contact to non-rotatably connect the inner hub and the first outer race. For an open position of the clutch, the conical outer race is displaceable in a second axial direction, opposite the first axial direction, to separate the portion of the conical outer race from the first outer race so that the inner hub and the first outer race are rotatable relative to each other.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 4B is a detail of area 4B in FIG. 4A;

FIG. 5B is a detail of area 5B in FIG. 5A; and,

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
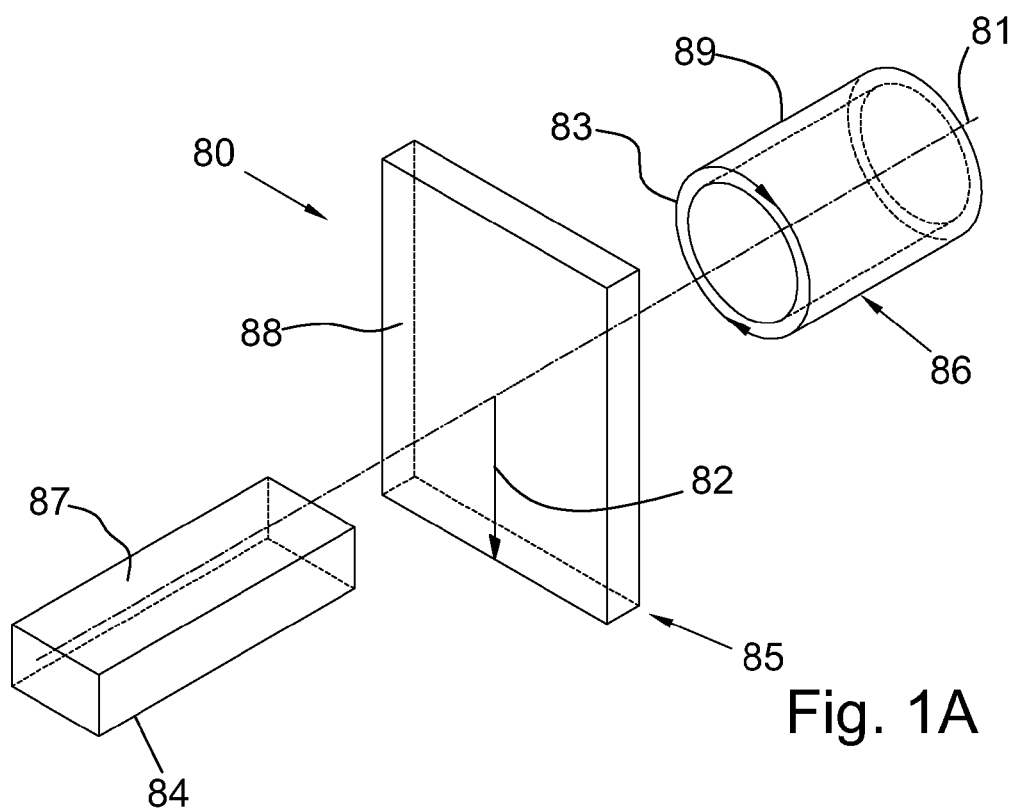
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
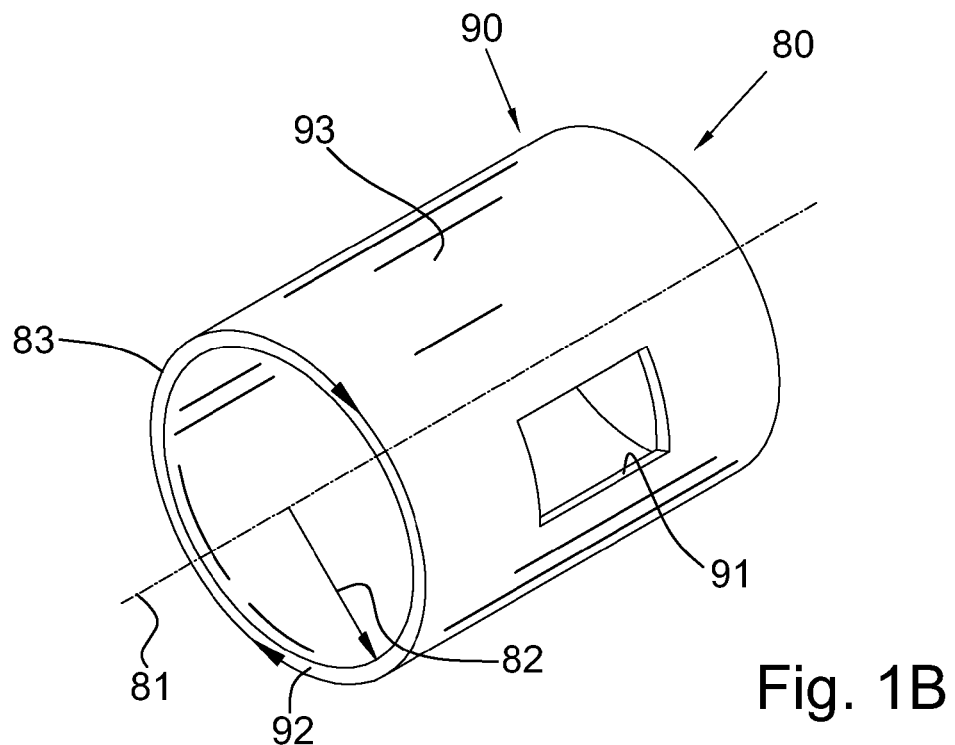
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

It should be understood that FIGS. 2A through 6B are schematic in nature and are not to scale. Further, features in FIGS. 2A through 6B such as proportions, sizes, lengths, spacing, widths, gaps, and contact surfaces, are not to scale and may be exaggerated or otherwise altered for the sake of clarity.

Figure 2:
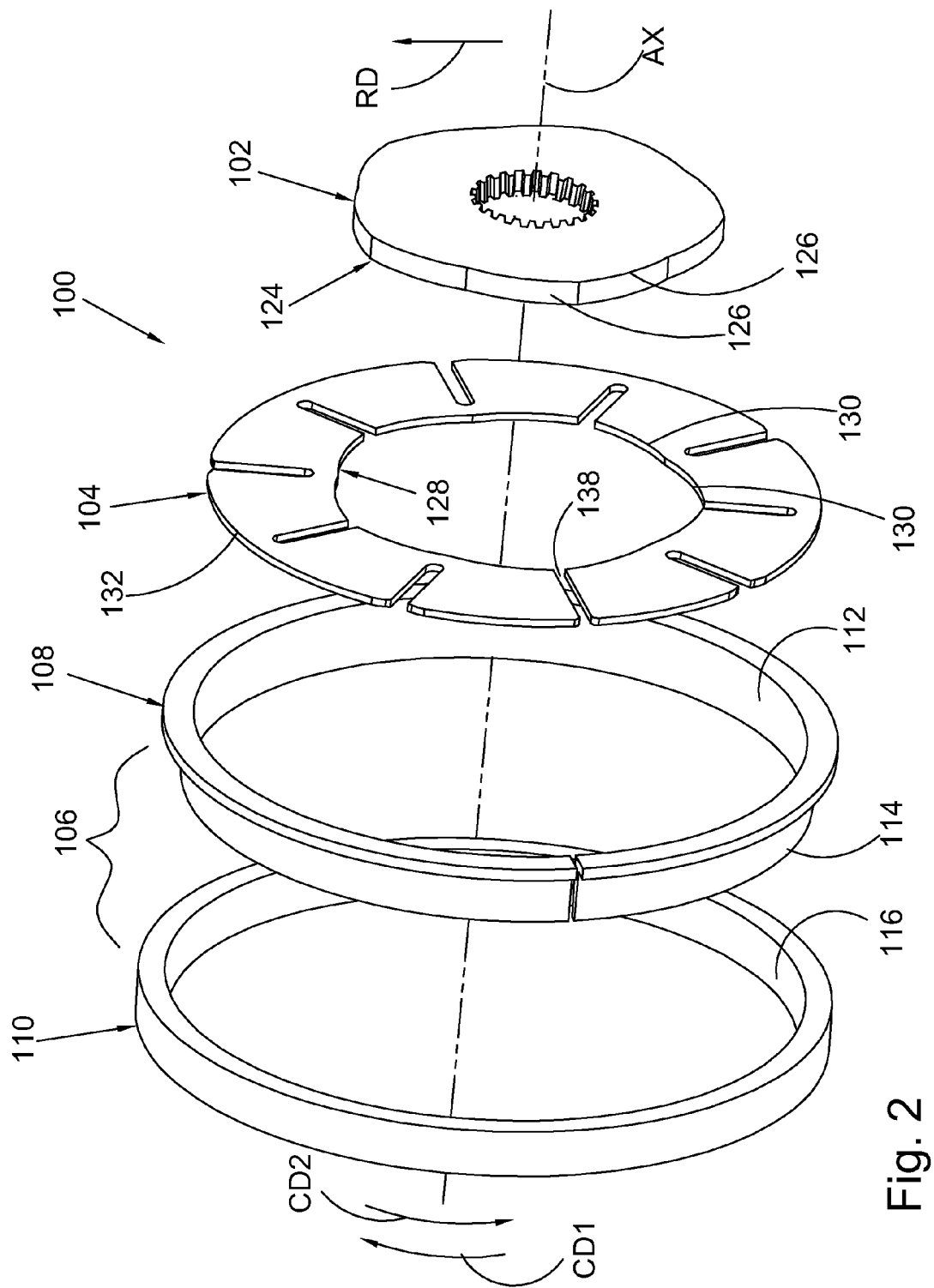
FIG. 2 is an exploded view of a switchable wedge clutch.

FIG. 2 is an exploded view of switchable wedge clutch 100.

Figure 3:
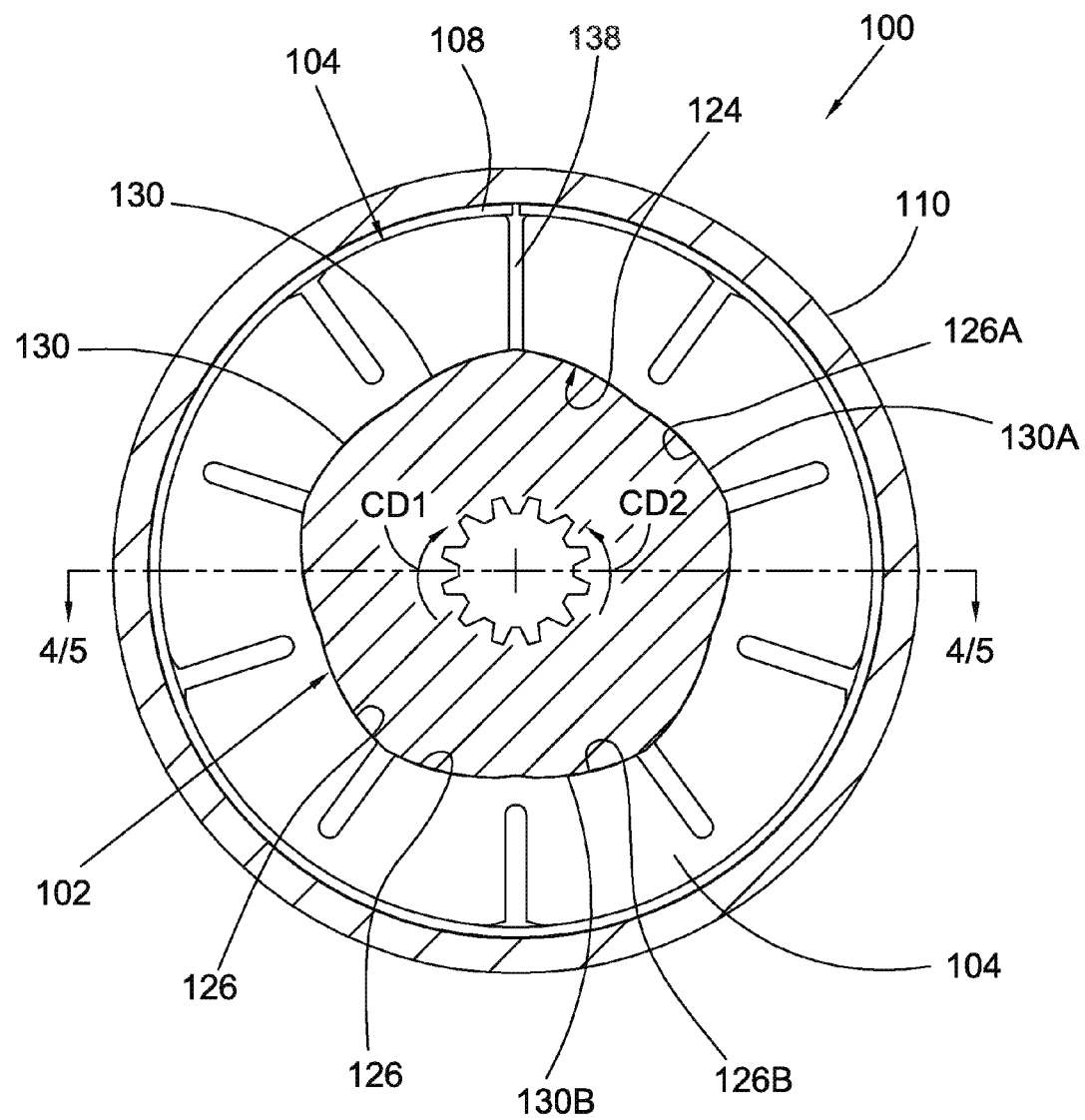
FIG. 3 is a back view of the switchable wedge clutch of claim 2 in a closed position.

FIG. 3 is a back view of switchable wedge clutch 100 of FIG. 2. The following should be viewed in light of FIGS. 2 and 3. Clutch 100 includes inner hub 102, wedge plate 104, and outer race assembly 106 including conical outer race 108 and outer race 110. Wedge plate 104 is located between hub 102 and assembly 106 in radial direction RD orthogonal to axis of rotation AX for clutch 100. As further described below, in a closed position for wedge clutch 100, plate 104 is non-rotatably connected to inner hub 102 and outer race assembly 106. More specifically, in the closed position for clutch 100, plate 104 is non-rotatably connected to hub 102 and race 108 and race 108 is non-rotatably connected to race 110. In an open position for the wedge clutch, the inner hub and outer race 110 are rotatable relative to each other.

Figure 4A:
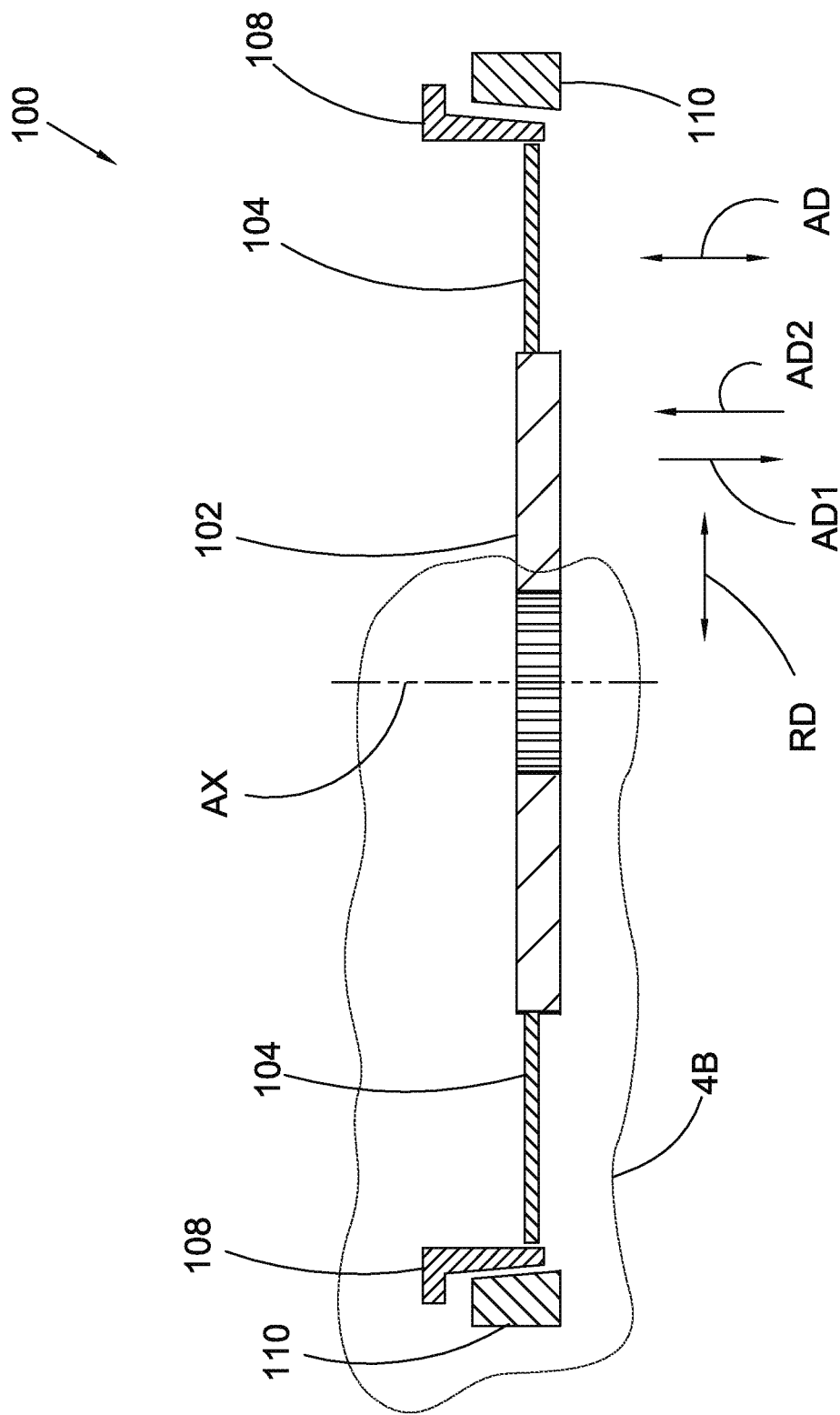
FIG. 4A is a cross-sectional view generally along line 4/5-4/5 in FIG. 3, showing the switchable wedge clutch of FIG. 2 in an open position.

FIG. 4A is a cross-sectional view generally along line 4/5-4/5 in FIG. 3, showing switchable wedge clutch 100 of FIG. 2 in an open position.

FIG. 4B is a detail of area 4B in FIG. 4A.

FIG. 5 is a cross-sectional view generally along line 4/5-4/5 in FIG. 3, showing switchable wedge clutch 100 of FIG. 2 in a closed position.

Figure 5A:
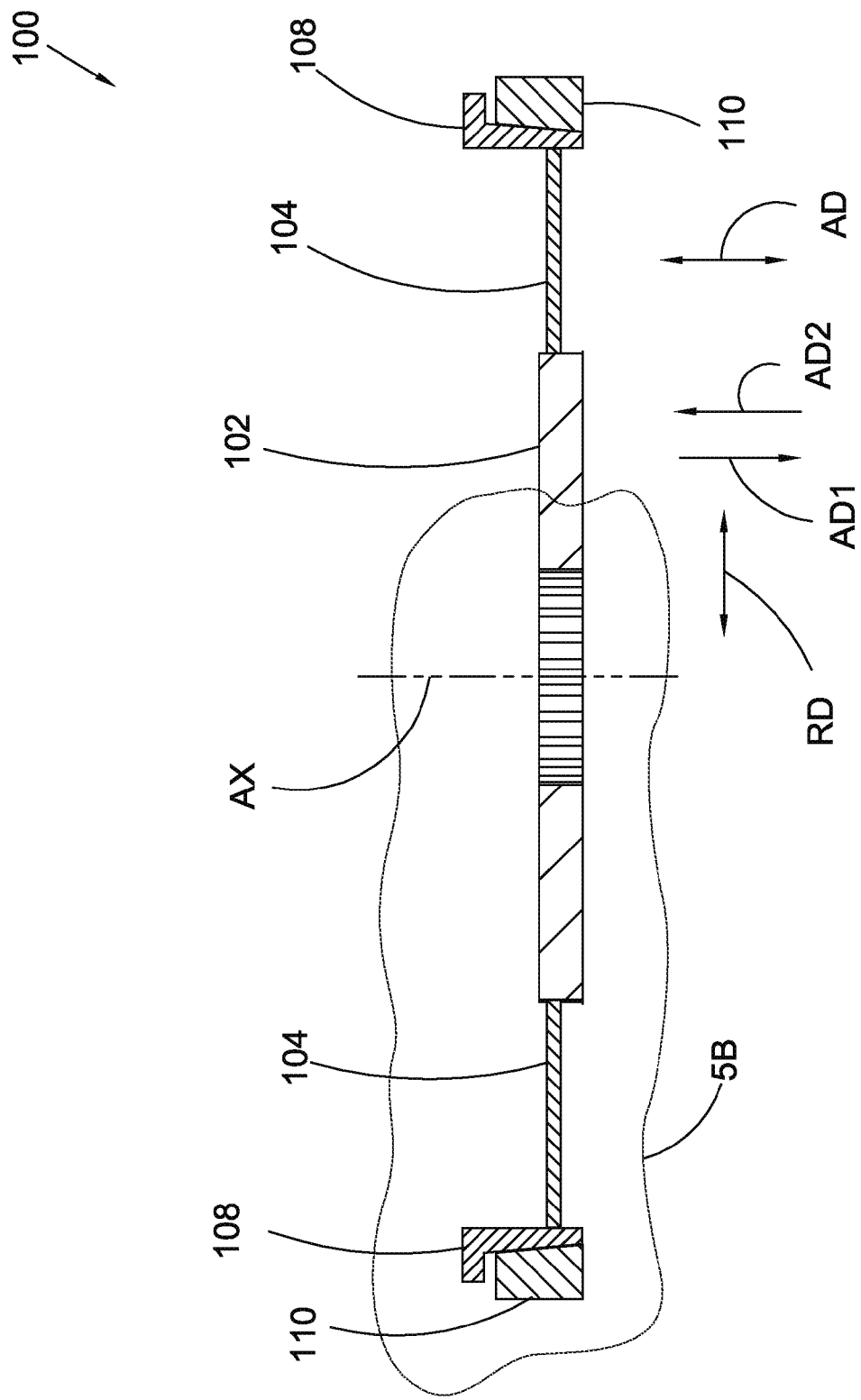
FIG. 5A is a cross-sectional view generally along line 4/5-4/5 in FIG. 3, showing the switchable wedge clutch of FIG. 2 in a closed position.

FIG. 5B is a detail of area 5B in FIG. 5A. The following should be viewed in light of FIGS. 2 through 5B. Conical outer race 108 includes radially inner surface 112 and radially outer surface 114. Outer race 110 includes radially inner surface 116. Portion 114A of surface 114 and portion 116A of surface 116 are aligned in radial direction RD. In an example embodiment, at least some of portion 114A is aligned with surface 116 in axial direction AD parallel to axis AX. Portion 108A of conical outer race 108 is located radially inward of outer race 110 and in alignment with outer race 110 in radial direction RD.

In the open position of FIGS. 4A and 4B, surfaces 114 and 116 are free of contact, for example, surfaces 114 and 116 are separated by gap 118 along length 120 of surface 114. Thus, races 108 and 110 are independently rotatable with respect to each other in rotational, or circumferential, directions CD1 and CD2 about axis AX. In the closed position of FIGS. 5A and 5B, surfaces 114 and 116 are in contact and non-rotatably connected.

Surface 114 slopes toward axis AX in direction AD1, as shown by angle AGL1. Surface 116 slopes toward axis AX in direction AD1, as shown by angle AGL2. To switch wedge clutch 100 from the open position of FIGS. 4A and 4B to the closed position of FIGS. 5A and 5B, the conical outer race is arranged to displace axial direction AD1, such that surface 114, in particular portion 114A, contacts and slides across surface 116. Outer race 110 is radially fixed; therefore, the movement of sloped surface 114 across sloped surface 116 generates radially inward compressive force on outer race 108, displacing portion 108A radially inward. The inward displacement of race 108 engages race 108 with the wedge plate. The displacement of race 108 in direction AD1 also frictionally engages surfaces 114 and 116. As a result, races 108 and 110 are non-rotatably connected and as further explained below, relative rotation between the inner hub and race 110 causes wedge plate 104 to non-rotatably connect with race 108 and the inner hub.

To switch wedge clutch 100 from the closed position of FIGS. 5A and 5B to the open position of FIGS. 4A and 4B, the conical outer race is arranged to displace in axial direction AD2, opposite AD1, relieving the radially inward compressive force noted above, separating surface 114 from surface 116, enabling race 108 to expand radially outward, and creating gap 118. As further explained below, the radially outward expansion of race 108 enables relative rotation between the inner hub and race 110.

In an example embodiment, outer race 110 is fixed with respect to movement in directions AD1 or AD2. In an example embodiment, wedge plate 104 is fixed with respect to movement in directions AD1 or AD2 and race 108 displaces in directions AD1 and AD2 with respect to the wedge plate.

Figure 6:
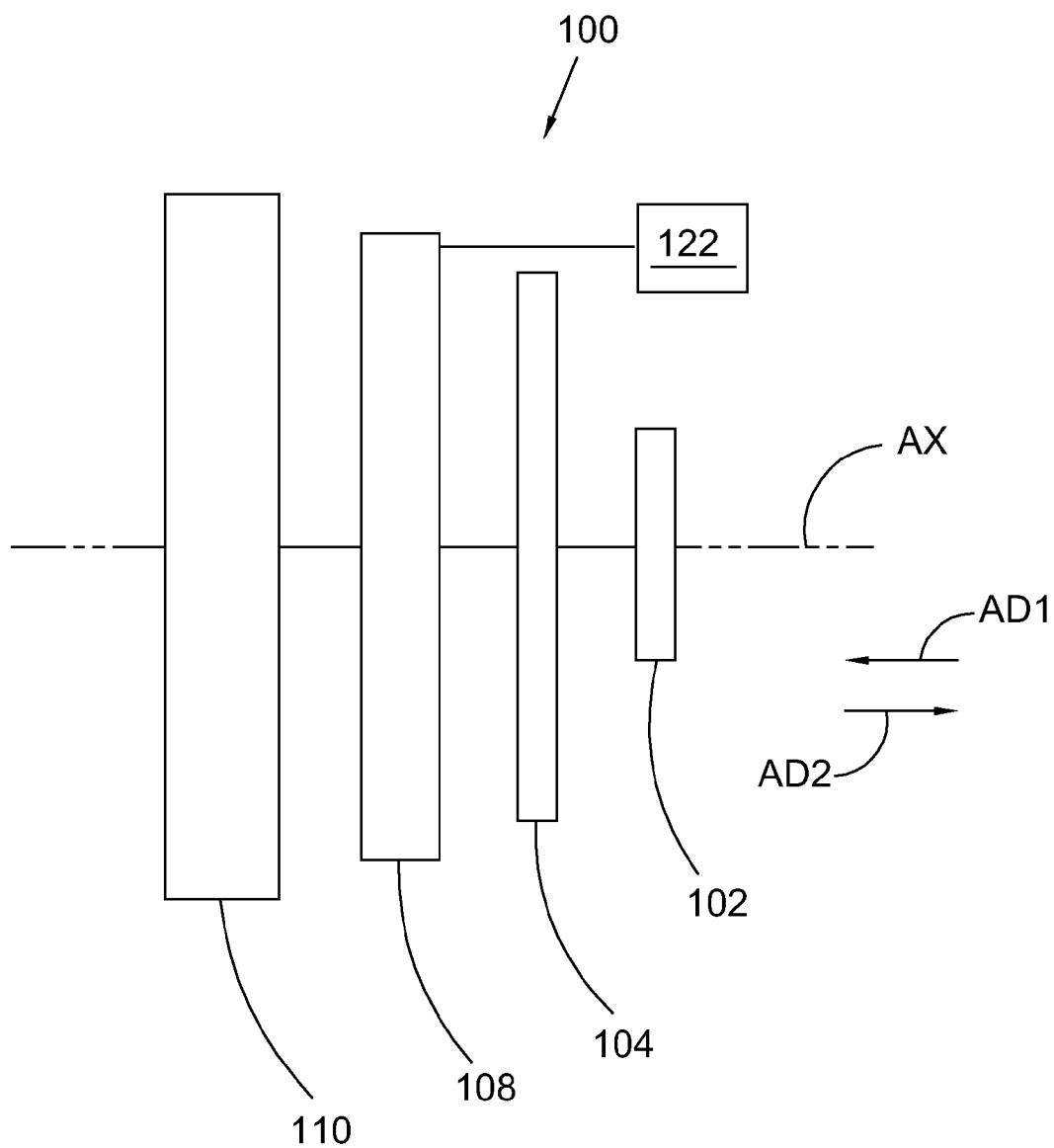
FIG. 6 is a schematic block diagram of the wedge clutch of FIG. 2 showing an actuator.

FIG. 6 is a schematic block diagram of the wedge clutch of FIG. 2 showing actuator 122. Actuator 122 is used to displace race 108 in axial directions AD1 and AD2. Any actuator known in the art, including, but not limited to mechanical, hydraulic, or pneumatic actuators can be used for actuator 122.

Returning to FIGS. 2 through 5B, in an example embodiment, radially outer surface 124 of inner hub 102 includes radially outwardly extending ramps 126. Wedge plate 104 includes radially inner surface 128 with radially inwardly extending ramps 130. In the open position for clutch 100, ramps 126 and 130 are engaged and radially outer surface 132 of wedge plate 104 is free of contact with radially inner surface 134 of race 108, for example, surfaces 132 and 134 are separated by gap 136. The inner hub and the wedge plate rotate together and are rotatable with respect to race 108. Due to gap 118, race 108 is rotatable with respect to outer race 110.

To transit from the open position of clutch 100 to the closed position for clutch 100, race 108 is axially displaced in direction AD1 so that surfaces 114 and 116 frictionally engage, non-rotatably connecting races 108 and 110 and displacing race 108 radially inward to engage surface 132 of the wedge plate as described above. The non-rotatable connection of races 108 and 110 and the engagement of wedge plate 104 with race 108 enables relative rotation between wedge plate 104 and inner hub 102. For example, for relative rotation of wedge plate 104 with respect to the inner hub in circumferential direction CD1, ramps 130A begin to slide along ramps 126A in direction CD1. Thus, the radially inwardly increasing portions of ramps 130 slide across the radially outwardly increasing portions of ramps 126 causing wedge plate 104 to expand radially outward to relieve the force between ramps 126 and 130. As a result, plate 104 is wedged between the inner hub and race 108, non-rotatably connecting the inner hub and race 108.

For example, for relative rotation of wedge plate 104 with respect to the inner hub in circumferential direction CD2, ramps 130B begin to slide along ramps 126B in direction CD2. Thus, the radially inwardly increasing portions of ramps 130 slide across the radially outwardly increasing portions of ramps 126 causing wedge plate 104 to expand radially outward to relieve the force between ramps 126 and 130. As a result, plate 104 is wedged between the inner hub and race 108, non-rotatably connecting the inner hub and race 108. In an example embodiment, plate 104 includes gap 138 to facilitate radial displacement of plate 104.

In an example embodiment, angles AGL1 and AGL2 are calculated such that the frictional engagement and non-rotatable connection of surfaces 114 and 116 is self-locking Thus, outer races 108 and 110 are not pushed apart (race 108 is not displaced in direction AD2 with respect to race 110) due to forces from wedge plate 104, for example, radially directed forces due to a torque load on clutch 100. As a result, it is not necessary to keep actuator 122 actively engaged to apply pressure to outer race 108, reducing the energy requirement and increasing the service life for actuator 122. In another example embodiment, the angles are calculated so that only a minimal force from actuator 122 keeps the clutch engaged and removal of the actuator force disengages the clutch.

Advantageously, outer race assembly provides a means of opening and closing clutch 100 without the necessity of changing or removing torque loads on the inner hub or outer race 110 and without the necessity of modifying rotation of the inner hub or outer race 110. Regardless of the torque loads on clutch 100 or relative rotation of components of clutch 100, outer race 108 can be axially displaced in directions AD1 and AD2 to close and open the clutch, respectively.

Further, since outer races 108 and 110 are not in contact in the open position for clutch 100, frictional losses associated with operation of clutch 100 in the open mode are eliminated or greatly reduced.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:
1. A wedge clutch, comprising:
    an inner hub including a first radially outer surface with a plurality of radially outwardly extending ramps;
    an outer race assembly including:
        a first outer race; and,
        a conical outer race:
            including a portion aligned with the first outer race in a radial direction orthogonal to an axis of rotation for the wedge clutch; and,
            axially displaceable with respect to the first outer race to open and close the wedge clutch; and,
    a wedge plate:
        radially located between the inner hub and the outer race assembly; and,
        including a first radially inner surface with a plurality of radially inwardly extending ramps engaged with the plurality of radially outwardly extending ramps, wherein:
            in a closed position for the wedge clutch, the wedge plate is non-rotatably connected to the inner hub and the first outer race; and,
            in an open position for the wedge clutch, the inner hub and the first outer race are rotatable relative to each other.
2. The wedge clutch of claim 1, wherein the conical outer race is displaceable:
    in a first axial direction, parallel to an axis of rotation for the wedge clutch, with respect to the first outer race to non-rotatably connect the inner hub and the first outer race; and,
    in a second axial direction, opposite the first axial direction, with respect to the first outer race to separate the conical outer race from the first outer race.
3. The wedge clutch of claim 1, wherein:
    the portion of the conical outer race is located radially inward of the first outer race in the radial direction.
4. The wedge clutch of claim 1, wherein:
    the wedge plate includes a second radially outer surface;
    the conical outer race includes a second radially inner surface;
    in the open position for the clutch, the second radially inner surface and the second radially outer surface are free of contact; and,
    in the closed position for the clutch, the second radially inner surface and the second radially outer surface are in contact.
5. The wedge clutch of claim 1, wherein:
    the first outer race includes a second radially inner surface;
    the portion of the conical outer race includes a second radially outer surface aligned with the second radially inner surface in the radial direction; and,
    the second radially inner surface and the second radially outer surface each slope toward the axis of rotation in a first axial direction parallel to the axis of rotation.
6. The wedge clutch of claim 5, wherein to switch the wedge clutch from the open position to the closed position the conical outer race is arranged to displace in the first axial direction to slide the second radially outer surface across the second radially inner surface to:
    displace the portion of the conical outer race radially inward; and,
    bring the conical outer race and the wedge plate into contact.
7. The wedge clutch of claim 6, wherein:
    in the open position for the wedge clutch, the respective pluralities of radially outwardly and inwardly extending ramps are in contact and the inner hub and the wedge plate rotate together; and,
    the contact of the wedge plate with the conical outer race is arranged to cause relative rotation between the wedge plate and the inner hub such that:
        the plurality of radially inwardly extending ramps slide along the plurality of radially outwardly extending ramps in a circumferential direction; and,
        the wedge plate expands radially outward to non-rotatably connect the inner hub with the first outer race.
8. The wedge clutch of claim 1, wherein the first outer race is fixed with respect to movement parallel to the axis of rotation.

9. The wedge clutch of claim 1, further comprising:
an actuator arranged to displace the conical outer race, in first and second opposite axial directions parallel to an axis of rotation for the wedge clutch, to switch the wedge clutch between the closed and open positions.

10. The wedge clutch of claim 1, wherein in the closed position the inner hub and first outer race are rotatable together in one of first or second opposite rotational directions about the axis of rotation for the wedge clutch.

11. A wedge clutch, comprising:
an inner hub including a first radially outer surface with a plurality of radially outwardly extending ramps;
an outer race assembly including:
a first outer race; and,
a conical outer race:
including a first portion aligned with the first outer race in a radial direction orthogonal to an axis of rotation for the wedge clutch; and,
including a second portion aligned with the first outer race in an axial direction parallel to the axis of rotation; and,
a wedge plate:
radially located between the inner hub and the conical outer race; and,
including a first radially inner surface with a plurality of radially inwardly extending ramps engaged with the plurality of radially outwardly extending ramps for the inner hub, wherein:
the conical outer race is axially displaceable with respect to the first outer race:
to bring the first and second portions into contact with the first outer race to non-rotatably connect the inner hub, the wedge plate, and the outer race assembly; and,
to separate the first and second portions from the first outer race to enable relative rotation between the inner hub and the first outer race.

12. The wedge clutch of claim 11, wherein:
the wedge plate includes a second radially outer surface;
the conical outer race includes a second radially inner surface;
in the open position for the clutch, the second radially inner surface and the second radially outer surface are free of contact; and,
in the closed position for the clutch, the second radially inner surface and the second radially outer surface are in contact.

13. The wedge clutch of claim 11, wherein:
the first outer race includes a second radially inner surface;
the first and second portions of the conical outer race include a second radially outer surface aligned with the second radially inner surface in the radial direction; and,
the second radially inner surface and the second radially outer surface each slope toward the axis of rotation in a first axial direction parallel to the axis of rotation.

14. The wedge clutch of claim 13, wherein to switch the wedge clutch from the open position to the closed position the conical outer race is arranged to displace in a first axial direction, parallel to the axis of rotation, to slide the second radially outer surface across the second radially inner surface to:
displace the first and second portions of the conical outer race radially inward; and,
bring the conical outer race and the wedge plate into contact.

15. The wedge clutch of claim 14, wherein:
in the open position for the wedge clutch, the respective pluralities of radially outwardly and inwardly extending ramps are in contact and the inner hub and the wedge plate rotate together; and,
the contact of the wedge plate with the conical outer race is arranged to cause relative rotation between the wedge plate and the inner hub such that:
the plurality of radially inwardly extending ramps slide along the plurality of radially outwardly extending ramps in a circumferential direction; and,
the wedge plate expands radially outward to non-rotatably connect the inner hub with the first outer race.

16. The wedge clutch of claim 11, wherein the first outer race is fixed with respect to movement parallel to the axis of rotation.

17. The wedge clutch of claim 11, further comprising:
an actuator arranged to axially displace the conical outer race.

18. A wedge clutch, comprising:
an inner hub;
an outer race assembly including
a first outer race; and,
conical outer race including a portion radially inward of the first outer race and aligned with the first outer race in a radial direction orthogonal to the axis of rotation; and,
a wedge plate engaged with the inner hub and the conical outer race and located between the inner hub and the conical outer race in the radial direction, wherein:
for a closed position of the wedge clutch, the conical outer race is displaceable in a first axial direction, parallel to the axis of rotation, to bring the portion of the conical outer race and the first outer race into contact to rotate the wedge plate with respect to the inner hub to non-rotatably connect the inner hub and the first outer race; and,
for an open position of the clutch, the conical outer race is displaceable in a second axial direction, opposite the first axial direction, to separate the portion of the conical outer race from the first outer race so that the inner hub and the first outer race are rotatable relative to each other.

19. The wedge clutch of claim 18, wherein:
the portion of the conical outer race includes a radially outer surface sloping toward the axis of rotation in the first axial direction;
the first outer race includes a radially inner surface sloping toward the axis of rotation in the first axial direction;
for the closed position of the wedge clutch, the conical outer race is displaceable in the first axial direction to bring the radially inner surface and the radially outer surface into contact to non-rotatably connect the inner hub and the first outer race; and,
for the open position of the wedge clutch, the conical outer race is displaceable in the second axial direction to separate the radially inner surface and the radially outer surface to enable relative rotation of the inner hub and the first outer race.

20. The wedge clutch of claim 19, wherein:
in the open position for the wedge clutch, the conical outer race and wedge plate are free of contact; and,
to switch the wedge clutch from the open position to the closed position the conical outer race is arranged to displace in the first axial direction to slide the radially outer surface across the radially inner surface to:

displace the portion of the conical outer race radially inward;

bring the conical outer race and the wedge plate into contact; and, cause relative rotation between the wedge plate and the inner hub.

* * * * *